(12) United States Patent
Jiao

(10) Patent No.: US 8,564,604 B2
(45) Date of Patent: Oct. 22, 2013

(54) SYSTEMS AND METHODS FOR IMPROVING THROUGHPUT OF A GRAPHICS PROCESSING UNIT

(75) Inventor: Yang (Jeff) Jiao, San Jose, CA (US)

(73) Assignee: VIA Technologies, Inc., Taipei (TW)

( * ) Notice: Subject to any disclaimer, the term of this patent is extended or adjusted under 35 U.S.C. 154(b) by 800 days.

(21) Appl. No.: 12/764,256

(22) Filed: Apr. 21, 2010

(65) Prior Publication Data

US 2010/0201703 A1 Aug. 12, 2010

(51) Int. Cl.
*G09G 5/39* (2006.01)

(52) U.S. Cl.
USPC ........... 345/557; 345/501; 345/522; 345/558; 345/589; 712/205; 712/206; 712/207

(58) Field of Classification Search
USPC .......... 345/557, 558, 501, 522, 589; 712/205–207
See application file for complete search history.

(56) References Cited

U.S. PATENT DOCUMENTS

| | | | |
|---|---|---|---|
| 7,454,599 B2 | 11/2008 | Jiao et al. | |
| 7,664,938 B1 * | 2/2010 | Tripathi et al. | 712/220 |
| 7,692,660 B2 | 4/2010 | Markovic et al. | |
| 7,877,565 B1 * | 1/2011 | Allen et al. | 711/165 |
| 8,094,158 B1 * | 1/2012 | Allen et al. | 345/536 |
| 8,195,922 B2 * | 6/2012 | Chen et al. | 712/205 |
| 2004/0024976 A1 * | 2/2004 | Mes | 711/151 |
| 2007/0091089 A1 | 4/2007 | Jiao et al. | |
| 2007/0113055 A1 * | 5/2007 | Dale et al. | 712/228 |
| 2009/0153570 A1 | 6/2009 | Jiao et al. | |
| 2009/0172362 A1 * | 7/2009 | Shen et al. | 712/220 |
| 2009/0189896 A1 * | 7/2009 | Jiao et al. | 345/426 |
| 2009/0210660 A1 * | 8/2009 | Webber | 712/205 |
| 2010/0161941 A1 * | 6/2010 | Vyshetsky et al. | 712/205 |
| 2011/0087864 A1 * | 4/2011 | Duluk et al. | 712/220 |

FOREIGN PATENT DOCUMENTS

| | | |
|---|---|---|
| CN | 1056968 A | 12/1991 |
| CN | 1928918 A | 3/2007 |

OTHER PUBLICATIONS

English translation of abstract of CN 1928918 A.
English translation of abstract of CN 1056968 A.

* cited by examiner

*Primary Examiner* — Xiao M. Wu
*Assistant Examiner* — Todd Buttram
(74) *Attorney, Agent, or Firm* — McClure, Qualey & Rodack, LLP

(57) ABSTRACT

Systems and methods for improving throughput of a graphics processing unit are disclosed. In one embodiment, a system includes a multithreaded execution unit capable of processing requests to access a constant cache, a vertex attribute cache, at least one common register file, and an execution unit data path substantially simultaneously.

22 Claims, 7 Drawing Sheets

SYSTEMS AND METHODS FOR IMPROVING THROUGHPUT OF A GRAPHICS PROCESSING UNIT

CROSS-REFERENCE TO RELATED APPLICATIONS

This application is related to co-pending U.S. patent application Ser. No. 11/954,621 filed Dec. 12, 2007 and entitled "TRIANGLE SETUP AND ATTRIBUTE SETUP INTEGRATION WITH PROGRAMMABLE EXECUTION UNIT," which is incorporated by reference in its entirety into the present disclosure. This application is related to co-pending U.S. patent application Ser. No. 12/764,243 filed Apr. 21, 2010, and entitled "SYSTEM AND METHOD FOR MANAGING THE COMPUTATION OF GRAPHICS SHADING OPERATIONS," which is incorporated by reference in its entirety into the present disclosure.

BACKGROUND

As is known, the art and science of three-dimensional ("3-D") computer graphics concerns the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (X, Y, Z) that defines a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, per-vertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume so as to include or eliminate background as desired.

Once this viewing area has been selected, clipping logic eliminates the polygons (i.e., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer.

For each polygon, the rasterizer determines which pixel positions are covered by the polygon and attempts to write the associated color values and depth (Z value) into a frame buffer. The rasterizer compares the depth values (Z) for the polygon being processed with the depth value of a pixel, which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, a video controller displays the contents of a frame buffer on a display one scan line at a time in raster order.

The default methods of performing real-time rendering typically display polygons as pixels located either inside or outside the polygon. The resulting edges which, define the polygon, can appear with a jagged look in a static display and a crawling look in an animated display. The underlying problem producing this effect is called aliasing and the methods applied to reduce or eliminate the problem are called anti-aliasing techniques.

Screen-based anti-aliasing methods do not require knowledge of the objects being rendered because they use only the pipeline output samples. One typical anti-aliasing method utilizes a line anti-aliasing technique called Multi-Sample Anti-Aliasing (MSAA), which takes more than one sample per pixel in a single pass. The number of samples or sub-pixels taken for each pixel is called the sampling rate and, axiomatically, as the sampling rate increases, the associated memory traffic also increases.

Although the foregoing has only briefly summarized the operation of the various processing components, persons skilled in the art will recognize that the processing on graphics data is quite intense. Consequently, it is desired to improve processing, design, and manufacturing efficiency wherever possible. Similarly, it is desired to improve throughput of the processing core of a graphics processing unit in order to maximize the performance of a given hardware design. Improvements in throughput can result in an increased pipeline efficiency, which can reduce the required hardware requirements and gate counts for a given performance level.

SUMMARY

The present disclosure is generally related to systems and methods for increasing throughput of a graphics processing unit. Briefly described, in architecture, one embodiment of the system, among others, can be implemented as follows: a graphics processing unit comprising an execution unit configured to execute programmable shader operations. The execution unit is further configured to process operations for a plurality of threads. The apparatus further comprises memory forming a register file configured to accommodate register operations for all threads executed by the execution unit. The memory is organized in a plurality of banks, with a first plurality of banks being allocated to a first plurality of the threads and a second plurality of banks being allocated to the remaining threads.

In certain embodiments, the apparatus further comprises memory forming a constant cache configured to accommodate the fetching of certain constants used for a plurality of shader operations executed within the execution unit, the constant cache configured to store a plurality of contexts of values corresponding to a plurality of types of shaders. The constant cache is further configured to store a plurality of contexts corresponding to a plurality of versions of values stored within the constant cache. The apparatus further includes memory forming a vertex attribute cache configured to accommodate the storing of certain vertex attributes used in programmable shader operations executed by the execution unit.

One embodiment of a method includes fetching a first instruction in an execution unit from an instruction cache on behalf of one of a plurality of active threads. The methods further include broadcasting the first instruction to the plurality of active threads, and queueing the first instruction in an instruction queue corresponding to at least one of the plurality of active threads. The methods further include decoding a second instruction in the instruction queue of at least one of the plurality of active threads, and submitting the second instruction to at least one of: a constant cache, a vertex attribute cache, a first common register file, a second common register file, and an execution unit data path.

An alternative embodiment of a system can be implemented as follows: a graphics processing unit comprising an execution unit capable of multi-threaded operation, the execution unit having a thread controller, the thread controller including a first instruction fetch arbiter and a second instruction fetch arbiter. The first instruction fetch arbiter is configured to fetch instructions on behalf of at least half of a plurality of threads within the execution units; and the second instruction fetch arbiter is configured to fetch instructions on behalf of the remainder of the plurality of threads.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE DRAWINGS

Figure 1:
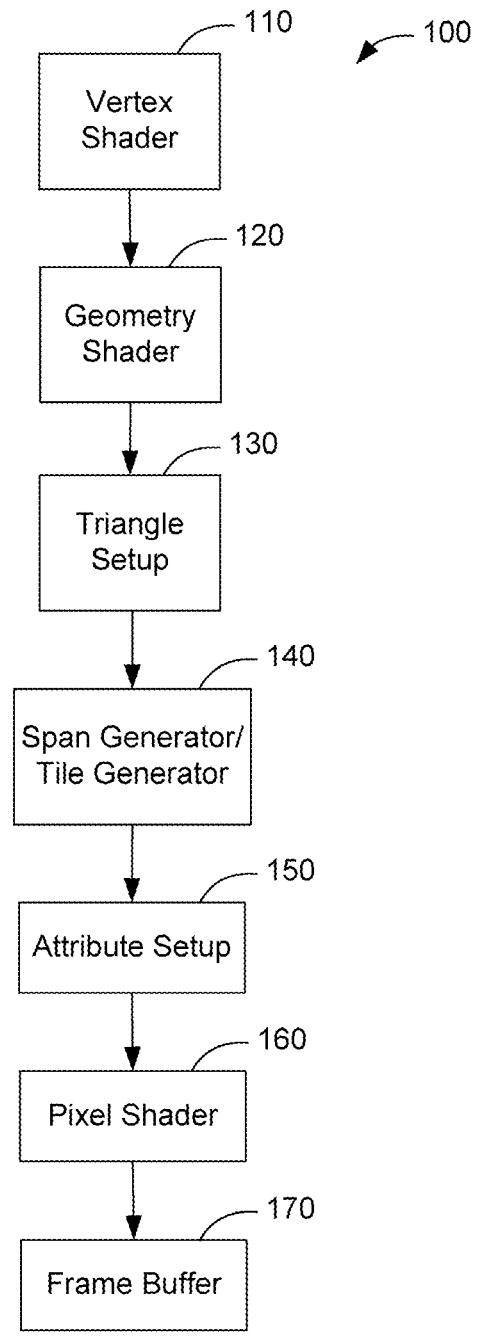
FIG. 1 depicts a functional flow diagram of certain components within a graphics pipeline in a computer graphics system as known in the prior art.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

As summarized above, the present invention is directed to a novel system and method for improving the throughput of a graphics processing unit. Before discussing implementation details of various embodiments, reference is made to FIG. 1, which is a block diagram illustrating certain components in a graphics pipeline, which may be utilized by or in embodiments of the present invention. The principal components illustrated in FIG. 1 are a vertex shader 110, geometry shader 120, triangle setup 130, scan and tile generator 140, and attribute setup block 150, pixel shader 160, and a frame buffer 170. The general function and operation of these components are known and understood by persons skilled in the art, and therefore need not be described in detail herein. To summarize, however, graphics primitives may be defined by location data (e.g., X, Y, Z, and W coordinates) as well as lighting and texture information. All of this information, can be passed to a vertex shader 110. As is known, the vertex shader 110 may perform various transformations on the graphics data received from the command list. In this regard, the data may be transformed from World coordinates into Model View coordinates, into Projection coordinates, and ultimately into Screen coordinates. The functional processing performed by the vertex shader 110 is known and need not be described further herein. The vertex shader 110 outputs a geometry primitive to a geometry shader 120.

Geometry and other graphics data generated by the geometry shader 120 are communicated to logic 130 for performing a triangle setup operation. Specific functions and implementation details of the triangle setup logic 130 may vary from embodiment to embodiment. In general, vertex information about triangle primitives may be passed to the triangle setup logic 130, and operations may be performed on the various primitives defined by the graphics data that is passed to the triangle setup logic 130. Among other operations, certain geometry transformations may be performed within the triangle setup logic 130.

By way of illustration, for a given vertex, geometry data such as x, y, z, and w information may be provided (where x, y, and z are geometric coordinates, and w is the homogenous coordinate). As is known by persons skilled in the art, various transformations may be made from, for example, model space to world space to eye space, to projection space, to homogeneous space, to normalized device coordinates (or NDC), and finally to screen space (performed by a viewport transformation). It would be appreciated that certain components of the depicted graphics pipeline have been omitted from the illustration for ease of depiction and clarity, but are known to those skilled in the art. As a non-limiting example, certain stages of the rasterization pipe of a graphics pipeline have been omitted for the sake of clarity, but a person of ordinary skill in the art would appreciate that the graphics pipeline may include those other stages.

The above described graphics pipeline is typically implemented within a graphics processing unit or graphics processing apparatus. Current graphics pipelines are typically guided by published application programming interfaces (API) or a collection of API's that impose certain requirements on the manufacturers of graphics processing units. A non-limiting example of such an API is the Direct3D® API. An alternative view of an implementation of a graphics pipeline is discussed below.

Figure 2:
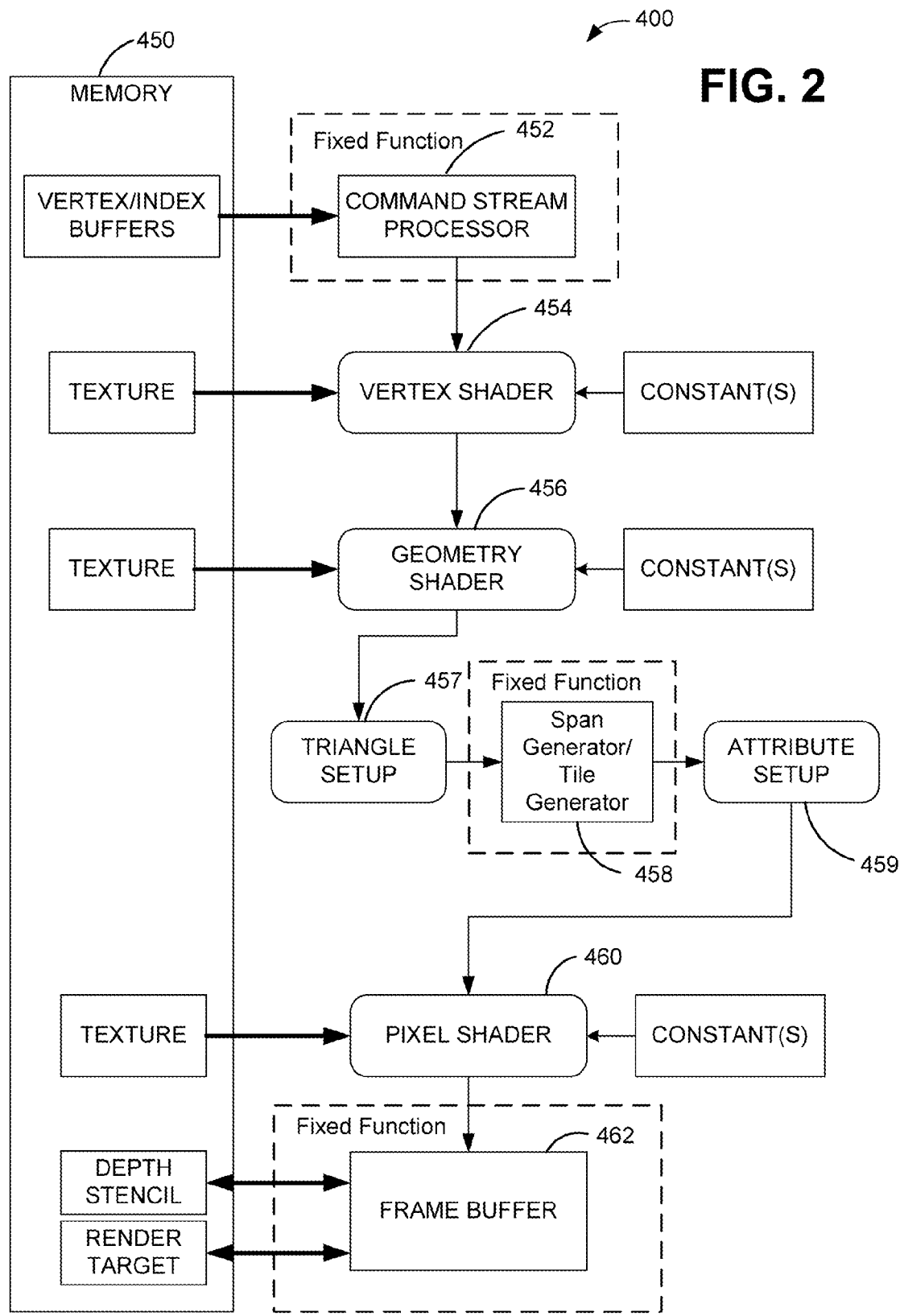
FIG. 2 depicts a block diagram illustrating certain fixed function and programmable components of a graphics system.

Reference is now made to FIG. 2 which is a block diagram illustrating certain components or stages of a graphics pipeline 400. The first component is designated as a command stream processor 452, which essentially receives or reads vertices out of memory, which are used to form geometry primitives and create working items for the pipeline. In this regard, the command stream processor 452 reads data from memory and from that data generates triangles, lines, points, or other primitives to be introduced into the pipeline. This geometry information, once assembled, is passed to the vertex shader 454. A requirement imposed by certain current graphics API's is that shaders such as the vertex shader 454 are user programmable stages of the graphics pipeline. In other words, a programmer utilizing such a graphics API is able to create a shader and program certain operations that shader execute. Accordingly, the vertex shader 454 is depicted in FIG. 2 with rounded edges, which is a convention hereinafter adopted to depict those stages of a graphics pipeline that are implemented by executing instructions in a programmable execution unit or pool of execution units in a processing core of a graphics processing unit. The vertex shader 454 processes vertices, by performing operations such as transformations, scanning, and lighting. Thereafter, the vertex shader 254 passes data to the geometry shader 456. The geometry shader 456 receives, as inputs, vertices for a full primitive, and is capable of outputting multiple vertices that form a single topology, such as a triangle strip, a line strip, point list, etc. The geometry shader 456 may be further configured to perform the various algorithms, such as tessellation, shadow volume generation, etc.

The geometry shader 456 outputs information to a triangle setup stage 457, which performs operations such as triangle trivial rejection, determinant calculation, culling, pre-attribute setup KLMN, edge function calculation and guardband clipping. The operations necessary for a triangle setup phase should be appreciated by one of ordinary skill in the art and need not be elaborated further. The triangle setup stage 457 outputs information to the span generator/tile generator. Among the operations performed by the span generator/tile generator 458 is the rejection of triangles if it is not necessary to render such a triangle to the screen. It should be appreciated that other elements of a rasterization pipeline may operate, such as, for example a Z-test or other fixed function elements of a graphics pipeline. For example a Z-test may be performed to determine the depth of a triangle to further determine if the triangle should be rejected as unnecessary to render to the screen. However, such elements are not further discussed herein as they should be appreciated by a person of ordinary skill in the art.

If a triangle processed by the triangle setup stage 457 is not rejected by the span generator/tile generator 458 or other stage of the graphics pipeline, then the attribute setup stage 459 of the graphics pipeline will perform attribute setup operations. The attribute setup stage generates the list of interpolation variables of known and required attributes to be determined in the subsequent stages of the pipeline. Further, the attribute setup stage 459, as is known in the art, processes various attributes related to a geometry primitive being processed by the graphics pipeline.

The pixel shader 460, is invoked for each pixel covered by the primitive that is output by the attribute setup stage 459. As is known, the pixel shader 460 operates to perform interpolations and other operations that collectively determine pixel colors for output to a frame buffer 462. The operation of the various components illustrated in FIG. 2 are well known to persons skilled in the art, and need not be further described herein. Therefore, the specific implementation and operation internal to these units need not be described herein to gain and appreciate a full understanding of the present invention.

Figure 3:
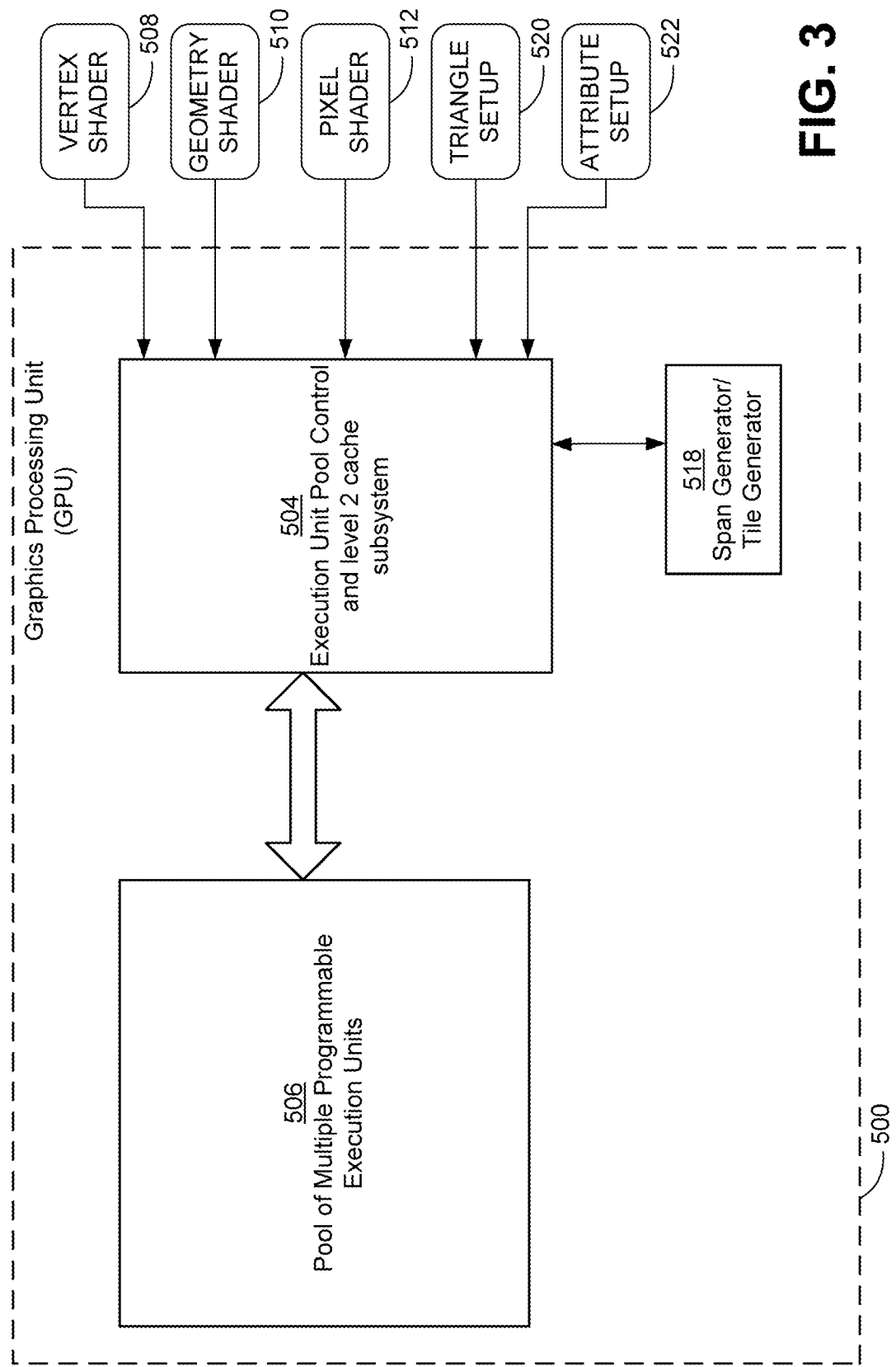
FIG. 3 depicts a functional block diagram illustrating a graphics processing unit and certain internal components of a graphics processing unit.

Reference is now made to FIG. 3, which is a block diagram showing an example processor environment for a graphics processor, constructed in accordance with embodiments of the invention. While not all components for graphics processing are shown, the components shown in FIG. 3 should be sufficient for one having ordinary skill in the art to understand the general functions and architecture related to such graphics processors. The exemplary processor environment of FIG. 3 is analogous to the environment disclosed in co-pending U.S. patent application Ser. No. 11/954,621 filed Dec. 12, 2007, which is incorporated by reference herein in its entirety.

Certain components of the graphics processing unit 500 have been omitted from the illustration for clarity; however, a person of ordinary skill in the art would appreciate that other hardware and logical components not pictured may be present in a graphics processing unit 500. The depicted graphics processing unit 500 includes a pool of multiple programmable execution units 506 and an execution unit pool control and cache subsystem 504. The execution unit pool control and cache subsystem 504 can handle thread management of the processing core of the pool of multiple programmable execution units 506 as well as communication between a user of the system and other components within the graphics processing unit 500. A cache subsystem including one or more caches for use by the execution unit pool can also reside in the execution unit pool control and cache subsystem 504. The cache subsystem can be used, for example, by a vertex shader thread to store data for use by a subsequent thread executing triangle setup operations or for typical memory transactions. Alternatively, each execution unit in the execution unit pool 506 may include an execution unit buffer for the storage of data for use by a subsequent thread executing within the same execution unit.

As noted above, user programmable stages of a graphics pipeline, such as a geometry shader 510, a vertex shader 508 or a pixel shader 512 are executed within the execution unit pool. Because the pool of execution units is preferably a processing core capable of multithreaded operation, the execution unit pool control and cache subsystem 504 is preferably responsible for scheduling of threads within the execution unit pool 506. When the execution unit pool control and cache subsystem 504 receives a request for the execution of a programmable shader, it will instruct an execution unit in the execution unit pool 506 to create a new thread for execution of the shader. The execution unit pool control and cache subsystem 504 can manage load across the execution unit pool as well as shift resources from one type of shader to another to efficiently manage throughput of the graphics pipeline. Such thread management techniques should be appreciated and need not be discussed in further detail herein. However, by way of example, if pixel shader operations are the source of a bottleneck in terms of throughput of the GPU 500, then the execution unit pool control and cache subsystem 504 can allocate more execution unit resources to pixel shader operations in order to improve throughput.

Figure 4:
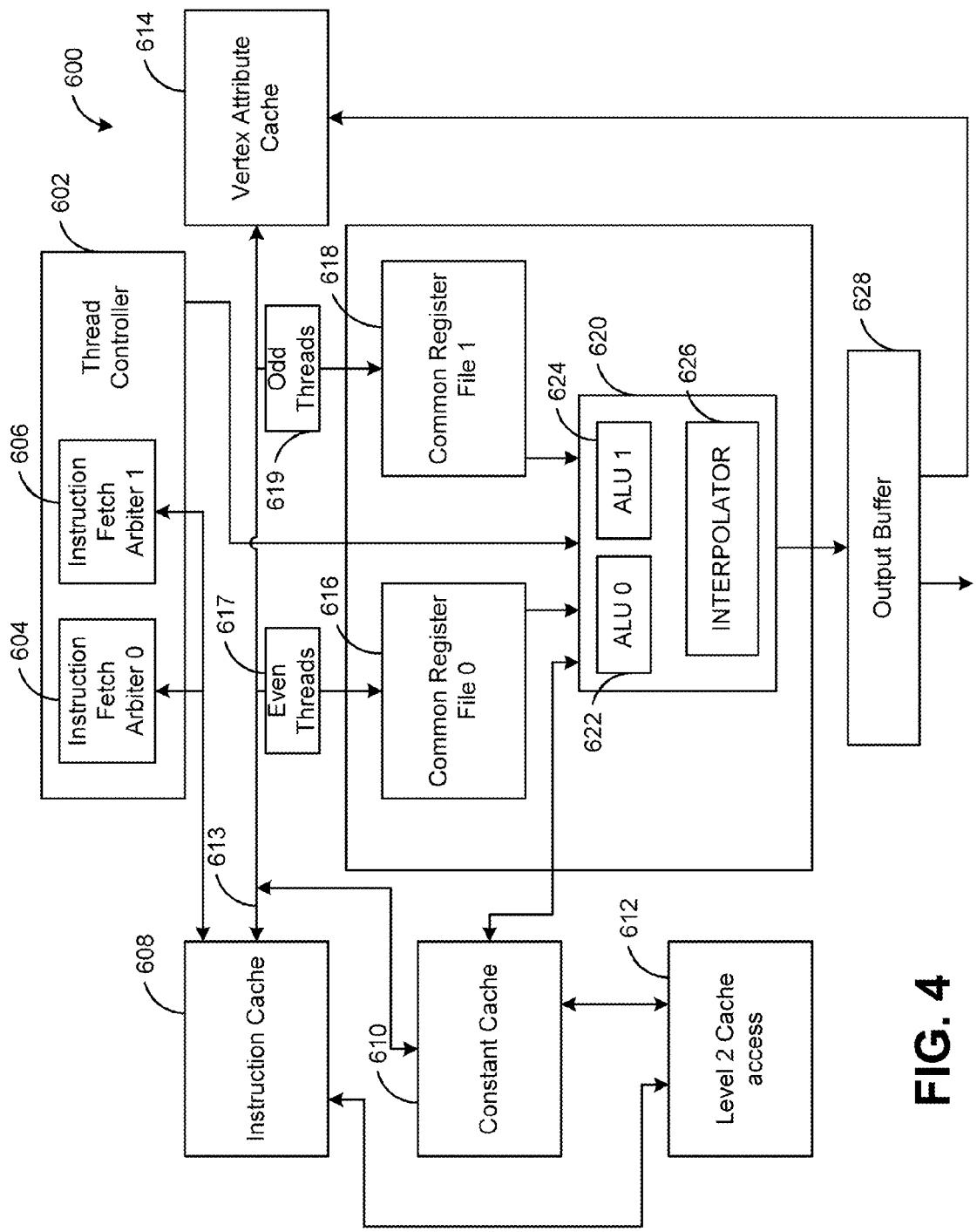
FIG. 4 depicts a functional block diagram of an execution unit of a graphics processing unit in accordance with an embodiment of the disclosure.

Reference is now made to FIG. 4, which depicts a functional block diagram of relevant portions of an execution unit 600. An execution unit 600 is capable processing multiple instructions simultaneously. Therefore, a pool of execution units as noted above is capable of processing multiple shader threads at once. The execution unit 600 includes a thread controller 602, which further includes instruction fetch arbiter 0 604 and instruction fetch arbiter 1 606. The thread controller 602 manages tasks assigned to an execution unit 600 and manages active threads and "sleeping" threads within the execution unit 600. As is known, an active thread is a thread corresponding to a task that is ready for processing. In other words, data required by the thread is available to the thread and thus the execution unit can process the thread. A sleeping thread is a thread assigned to a task by the thread controller that is not ready for processing. In other words, a sleeping thread may exist in a state of where it is awaiting data from various other components of a graphics processing unit. The depicted thread controller 602 includes two instruction fetch arbiters 604, 606 because the processing of threads is divided, in the illustrated embodiments, into even and odd numbered threads. For example, if an execution unit is capable of processing sixteen threads at once, half of the sixteen threads, or even numbered threads, can be assigned to instruction fetch arbiter 0 604 while the remaining threads can be assigned to instruction fetch arbiter 1 606. Dividing the threads into two groups each with a separate instruction fetch arbiter can improve the throughput of the execution unit 600 by reducing the latency related to instruction fetching. Of course, threads may be divided or allocated in other ways as well.

The instruction fetch arbiters 604, 606 can independently arbitrate requests to fetch instructions on behalf of active threads executing within the execution unit 600 based on the age of the requesting thread. Upon receiving a request for an instruction from a thread, instruction fetch arbiter 0 604 or instruction fetch arbiter 1 606 can request an instruction from an instruction cache 608, which can be a cache maintaining a cache of instructions. The instruction cache 608 may include an instruction cache controller that performs a hit test to determine whether a requested instruction resides within the instruction cache 608. If a requested instruction does not reside within the instruction cache, or if the hit test results in a miss, then a requested instruction must be retrieved from level 2 cache or other memory via level 2 cache access 612. Fetched instructions are broadcast to even threads as well as odd threads on an instruction broadcast bus 613. Accordingly, if more than one thread is requesting the same instruction from instruction cache 608, this can reduce latency by eliminating at least one instruction fetch from the instruction cache 608. In other words, if more than one thread is requesting the same instruction from instruction cache 608, it is not necessary to individually fetch and deliver the instruction on behalf of each thread because the requested instruction is returned from instruction cache 608 via an instruction broadcast bus 613, which is available to all even and odd threads executing within the execution unit 600.

Following instruction fetch, threads within even 617 and odd 619 thread groups can determine whether a fetched instruction requires interaction with a constant cache 610, vertex attribute cache 614, common register file 0 616, or common register file 1 618. For example, materials properties may be required that reside in a constant cache 610 as well as other parameters which are not changed in a given context and constant for all vertices of an object being rendered. In addition light source properties may also reside in a constant cache 610, as they are normally stable through the generation of a frame. As is shown, the common register files 616, 618 are divided into an even and odd group just as threads are divided into an even and odd thread group. The structure and configuration of the common register files can be analogous to that disclosed in co-pending application serial number TKHR ref. 252209-1560; S3U05-0029 entitled "SYSTEM AND METHOD FOR MANAGING THE COMPUTATION OF GRAPHICS SHADING OPERATIONS" filed Apr. 21, 2010, which is incorporated by reference herein in its entirety. If an instruction requires data from constant cache 610, the data is requested from the constant cache 610 and the instruction is not issued until the requested data is ready. Similarly, if an instruction requires data from vertex attribute cache 614, the data is requested from vertex attribute cache 614 and the instruction is not issued until the requested data is ready. Further, if an instruction requires data from other components within a graphics processing unit but external to an execution unit, the instruction is not issued until the data is received from the external component. For example, an instruction may include a request to fetch texture data from components external to the execution unit and store in a register, which may require the thread to wait for data to be requested and delivered.

When data required for the execution of an instruction is ready, the thread controller 602 can issue an instruction for execution by the execution unit data path (EUDP) 620, which can include arithmetic logic unit 0 622, arithmetic logic unit 1 624, and interpolator 626. Upon completion of execution of the instruction by the EUDP 620, resultant data can be output by the output buffer 628 of the execution unit 600, which can send data to components of the graphics processing unit external to the execution unit, or, alternatively, to components within the execution unit including but not limited to the vertex attribute cache 614. For example, if an instruction execution requires updating data within the vertex attribute cache 614, the data can be send to the vertex attribute cache 614 via the output buffer 628 following execution by the EUDP 620. As another non-limiting example, the EUDP 620 may calculate a texture coordinate or other data and output the texture coordinate or other data to a texture unit or other component external to the execution unit via the data output buffer.

It should be appreciated that certain components and data paths have been omitted from the above-described illustration for sake of clarity and ease of depiction. For example, it should be appreciated that the thread controller may be coupled to execution unit pool control and level 2 cache subsystem to receive tasks to be managed within the execution unit. Further, certain components may require data from a level 2 cache, which may reside external to the depicted execution unit. Accordingly, level 2 cache access represents mechanisms for accessing a level 2 cache or other system memory.

Figure 5:
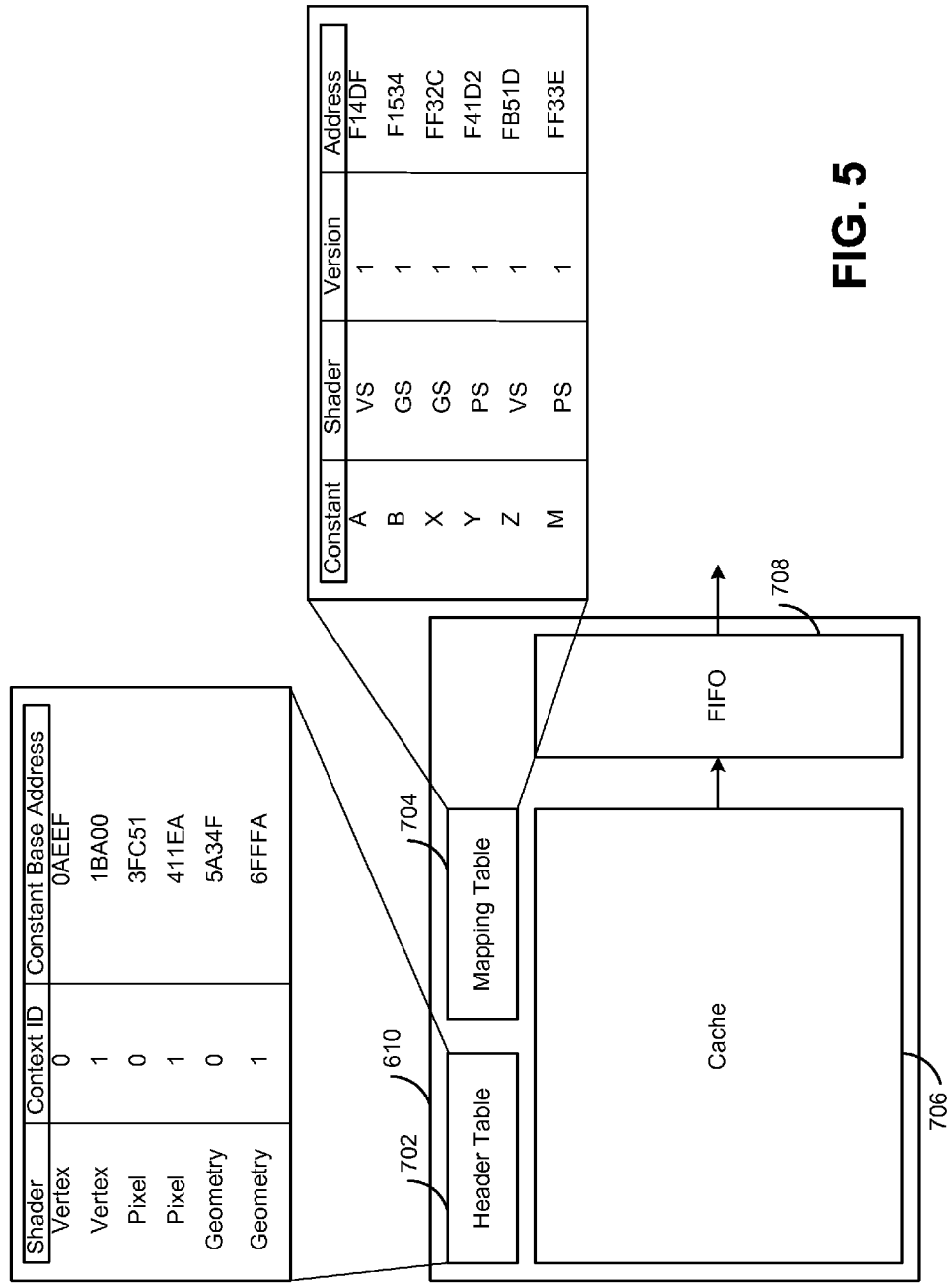
FIG. 5 depicts a functional block diagram of a constant cache of an execution unit in accordance with an embodiment of the disclosure.

Reference is now made to FIG. 5, which depicts a more detailed view of the constant cache 610 utilized within the execution unit of FIG. 4. Because the execution unit is capable of simultaneously processing multiple threads corresponding to different types of shader operations, such as pixel shader, vertex shader and geometry shader, the execution unit must maintain more than one set of constants for use by the EUDP. For example, an execution unit processing threads for pixel shader and vertex shader operations maintains constants for both pixel shader constants as well as vertex shader constants. The execution unit further maintains multiple contexts of constants as well as multiple versions of each constant context. For example, two threads executing pixel shader operations within an execution unit may exist in different contexts, so the execution unit maintains at least two different contexts of pixel shader constant values. Accordingly the depicted constant cache can be utilized to maintain at least two constant contexts for various types of shader threads.

Similarly, the execution unit is also required to maintain multiple versions of constants that may change within a context. For example, if a constant within a vertex shader context in memory is altered by a vertex shader thread, the constant cache can maintain a previous version of the altered constant as well as fetch from memory the altered version of the constant. Accordingly, other vertex shader threads within the execution unit can access the previous version or altered version of the constant depending on the requirements of the thread.

The constant cache 610 includes a header table 702, a cache 706, and a mapping table 704. Various constants for shader contexts are stored within the cache storage in according to a scheme defined by the header table 702. For example, the header table 702 can delineate groups of constants according shader type as well as context, or context ID. In the depicted example, constants corresponding to a shader type and context ID can be stored sequentially at a location in the cache specified by the base address. The header table 702 can store the base address corresponding to the location of constants stored substantially contiguously in the cache. A pixel shader thread can request a constant from the constant cache 610 by requesting a particular constant from a particular constant without containing knowledge of the actual location in the cache 706 of the constant cache 610. A shader thread requesting a constant from the constant cache 610 can request a constant only with knowledge of the constant's location within a particular context. In the hypothetical header table 702 of FIG. 5 with a non-limiting exemplary addressing scheme, a pixel shader thread existing in a context with a context ID of '0' can, for example, submit a request for the first pixel shader constant of context ID '0' and the constant cache will return the first constant located at or near the corresponding base address from the header table. Similarly, a vertex shader thread existing in a context with a context ID of '1' can submit a request for the second pixel shader constant of context ID '1' and the constant cache will return the second constant located at or near the corresponding base address from the header table 702.

Further, the constant cache 610 can also maintain multiple versions of constant if its value is altered by a thread processed by the execution unit. For example, in the non-limiting exemplary mapping table 704 of the depicted constant cache of FIG. 5, the mapping table 704 maintains data regarding constants that are altered by various shader threads and also tracks a version of each constant. For example, the first entry of the depicted mapping table 704 contains an exemplary entry for a vertex shader constant 'A' that has been modified by a vertex shader thread. Therefore, the constant cache 610 can maintain the previous value of this constant in within the cache 706 storage of the constant cache 610 for use by other threads if necessary. It should be appreciated that multiple versions of a constant's value can be maintained in this fashion.

The constant cache 610 also includes a FIFO 708 which serves as a mechanism for delivering data to shader threads or other threads processed by an execution unit 600. The FIFO 708 can be configured with varying sizes to accommodate a varying number of entries depending on the requirements of the execution unit the constant cache 610 is operating within. When a shader thread, for example, requests a constant from the constant cache 610, the constant is located utilizing the header table 702 and mapping table 704 and delivered to the FIFO 708. The FIFO 708 can then broadcast a signal to other components within the execution unit indicating that it is ready to deliver a constant. Because the execution unit is capable of processing multiple instructions simultaneously, the FIFO 708 within the constant cache 610 allows requests from other shader threads to fetch other constants prior to completing a previous request to fetch a constant and delivering it to a requesting thread. This enables to constant cache 610 improve throughput of the execution unit by increasing throughput of the servicing requests to read data from or write data to the constant cache 610. It should be appreciated that the disclosed header table 702, mapping table 704 and FIFO 708 of the constant cache 610 can be implemented in various ways, and that the disclosed implementation is but one of many possible examples, which will be readily appreciated by persons skilled in the art.

Figure 6:
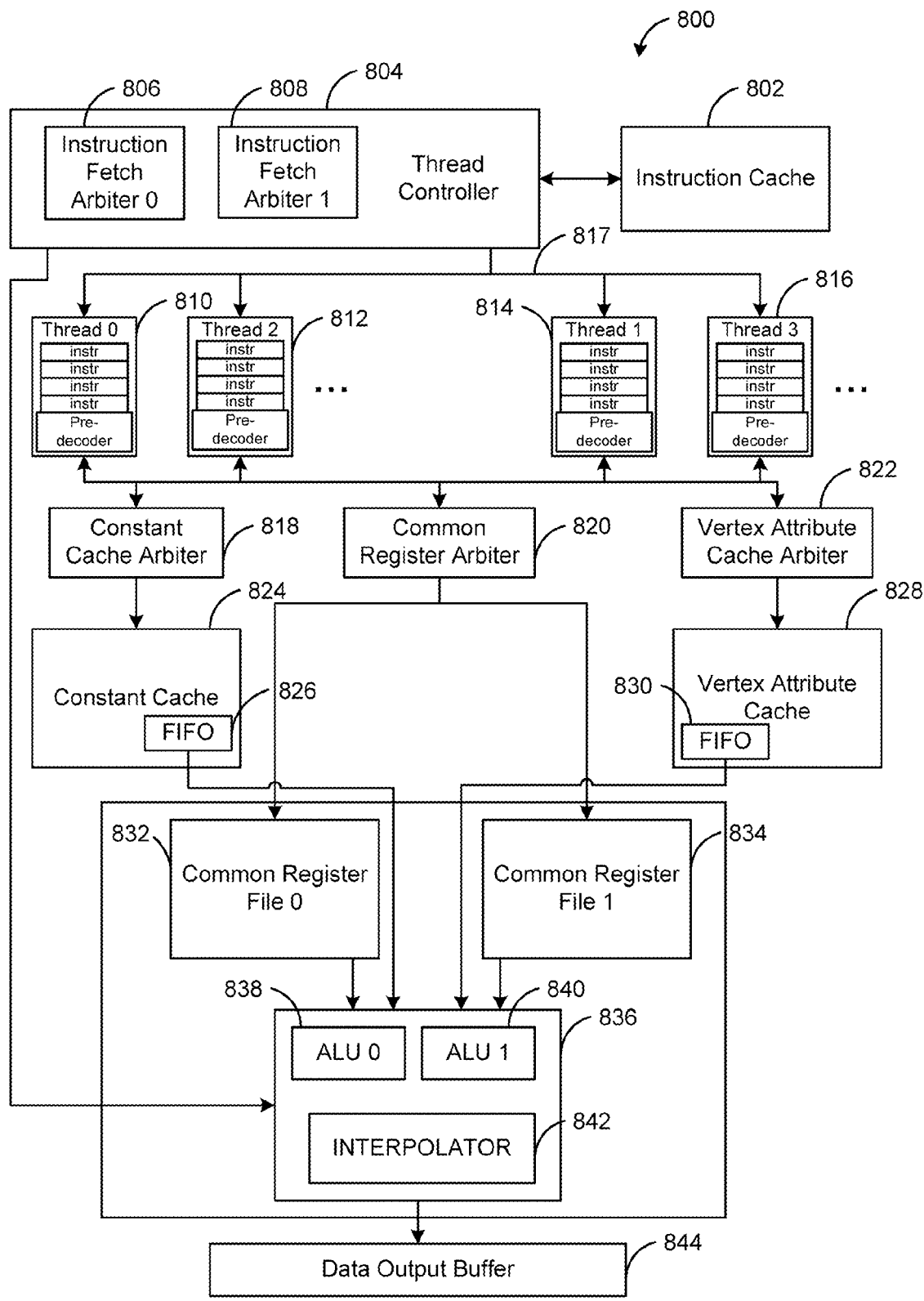
FIG. 6 depicts an alternative view of an execution unit in accordance with an embodiment of the disclosure.

Reference is now made to FIG. 6, which illustrates an alternative view of the execution unit 800 of FIG. 4. In addition to a thread controller 804 and instruction fetch arbiter 0 806 and instruction fetch arbiter 1 808, also depicted are active threads 810, 812, 816, 816 and corresponding instruction queues being processed by the execution unit 800. For ease of depiction and clarity, not all active threads and instruction queues are depicted, as it should be appreciated that more or fewer active threads can be processed by the execution unit 800. The depicted execution unit 800 can simultaneously process at least eight active threads that are separated into even and odd thread groups. Stated another way, the execution unit 800 can have at least eight instruction queues corresponding to at least eight active threads. The depicted active threads include instruction queues capable of queuing up to four instructions. The instruction fetch arbiters 806, 808 fetch instructions from instruction cache 802 on behalf of the active threads. Instruction fetch arbiter 0 806 fetches instructions on behalf of the even active threads 810, 812, while instruction fetch arbiter 1 808 fetches instructions on behalf of the four odd active threads 814, 816.

It should be appreciated that the instruction queues corresponding to the active threads can be configured with the ability to queue more or fewer instructions than the depicted four depending on the latency of fetching an instruction from the instruction cache or other memory system. Each instruction for each active thread is "pre-fetched" prior to its actual execution to remove the latencies that exist in sending a request for an instruction to the instruction cache as well as retrieving an instruction from a level 2 cache or other memory system in the event that it does not exist in the instruction cache. It should now be appreciated that decoupling the fetching of an instruction from its decoding and execution among various active threads can improve throughput and performance of the execution unit. Fetched instructions can be broadcast to even threads as well as odd threads on an instruction broadcast bus 817. Accordingly, if more than one thread is requesting the same instruction from instruction cache 802, this can reduce latency by eliminating at least one instruction fetch from the instruction cache 802. In other words, if more than one thread is requesting the same instruction from instruction cache 802, it is not necessary to individually fetch and deliver the instruction on behalf of each thread because the requested instruction is returned from instruction cache 802 via an instruction broadcast bus 817, which is available to all even and odd threads executing within the execution unit 800.

Each active thread further includes an instruction pre-decoder, which determines whether the next instruction to be processed is an instruction including a fetch or a store of a constant, an instruction including a fetch or a store of vertex attribute data, or an instruction with interaction with the one of the common register files 832, 834. If an instruction including a fetch or a store or constants or an interaction with the constant cache 826 is being processed by the pre-decoder, then the instruction pre-decoder corresponding to the active thread in which the instruction exists can submit the instruction request to the constant cache arbiter 818, which arbitrates access to the constant cache 824. In the above example, the constant cache arbiter 818 will submit a request to the constant cache 824. As noted above, the constant cache 824 will process a request to fetch constants and store the requested constant in a FIFO 826 within the constant cache 824.

Similarly, if an instruction in an instruction queue requests to fetch or store vertex attribute data or to otherwise interact with the vertex attribute cache 828, then the instruction pre-decoder can submit the request to the vertex attribute cache arbiter 822, which arbitrates access to the vertex attribute cache 828. The vertex attribute cache 828 can process a request to fetch data from the vertex attribute cache and store the requested data in a FIFO 830 coupled to the vertex attribute cache 828. If an instruction requests to interact with one of the common register files 832, 834, then the instruction pre-decoder of an active thread can submit the instruction request to the common register arbiter 820, which arbitrates requests to access either common register file 0 832 or common register file 1 834. The common register arbiter 820 can submit the instruction request to the common register file 0 832 or common register file 1 834 depending on whether the instruction originates from an even thread or an odd thread.

It should be appreciated that because the of depicted architecture of the execution unit of FIG. 6, throughput of the execution unit can be improved because requests to the constant cache 824, common register files 832, 834 and vertex attribute cache 828 can be submitted and handled in parallel prior to execution of the instruction by an execution unit datapath (EUDP) 836, with no one process acting as a bottleneck. For example, if an instruction including a request to fetch a constant requires the constant cache to fetch the requested constant from a level 2 cache or other system memory, this is an operation that may potentially require a few cycles to complete. However, in the disclosed execution unit, such a situation may not stall the remaining active threads because the execution unit is able to simultaneously process other instructions such as a request to interact with the common register files 832, 834 or the vertex attribute cache 828.

As noted above, the execution unit also contains an execution unit datapath (EUDP) 836, which executes a given instruction using data retrieved from at least the constant cache 824, the common register file 0 832, common register file 1 834, or the vertex attribute cache 828. The thread controller 804 can issue an instruction to the EUDP 836 when all of the data required for execution of the instruction is ready. For example, in the case of an instruction requesting a constant from the constant cache 824, if the requested constant has been stored in the constant cache FIFO 826, the thread controller 804 can then issue the instruction to the EUDP 836, which can read the data from the constant cache FIFO 826 and process any necessary outputs via the data output buffer 844. Similarly, if an instruction requiring interaction with either of the common register files 832, 834 is ready to be executed by the EUDP 836, then the thread controller 804 can issue the instruction to the EUDP 836. In other words, if the data required by the instruction is ready, then the thread controller 804 can issue the instruction for execution.

In addition, to further improve throughput of the execution unit, measures to optimize the execution of instructions by the EUDP 836 can be undertaken in accordance with the disclosure. For example, if an arithmetic instruction on two values within one of the common register files followed by an instruction to store the result in another register of one of the common register files can be combined into one instruction to improve throughput of the execution unit 800. The resulting instruction can simply perform an arithmetic operation and store the result directly in the destination register, removing the necessity of the execution unit 800 to execute an additional instruction to store the result of an arithmetic instruction in a register of one of the common register files. This can be accomplished by analyzing instructions within the instruction queue or by a compiler when compiling software code into machine instructions executed by the depicted execution unit. For example, a compiler translating software code into machine instructions can be configured to identify a case of the above exemplary arithmetic instruction followed by an additional instruction to move the result of the arithmetic instruction into a different register of the register file. In this case, a compiler can generate one instruction incorporating an arithmetic operation that stores the result in a destination register instead of generating two separate instructions to accomplish the same result.

As another non-limiting example, a common arithmetic instruction executed by a thread within an execution unit includes the calculation of a texture coordinate and the storing of the texture coordinate in a register of one of the common register files. Often, the next instruction executed by the thread following the calculation of a texture coordinate is a "sample" instruction, or an instruction that outputs the resulting texture coordinate to a texture unit or other component of a graphics processing unit via the data output buffer of the execution unit. This pair of operations can be optimized utilizing the above architecture by combining the two instructions into one instruction whereby, in one instruction, the texture coordinate is calculated and the destination of the texture coordinate can be designated as a texture unit or other component external to the execution unit. Therefore, the depicted execution unit architecture allows for at least 5 operations to be simultaneously processed by the execution unit. As a non-limiting example, the execution can simultaneously execute a constant cache fetch, a vertex attribute cache fetch, a fetch operation from constant register file 0, a fetch operation from constant register file 1, and the output of data from the EUDP, such as the above noted sample instruction to output a texture coordinate to a texture unit or other component external to the execution unit.

Figure 7:
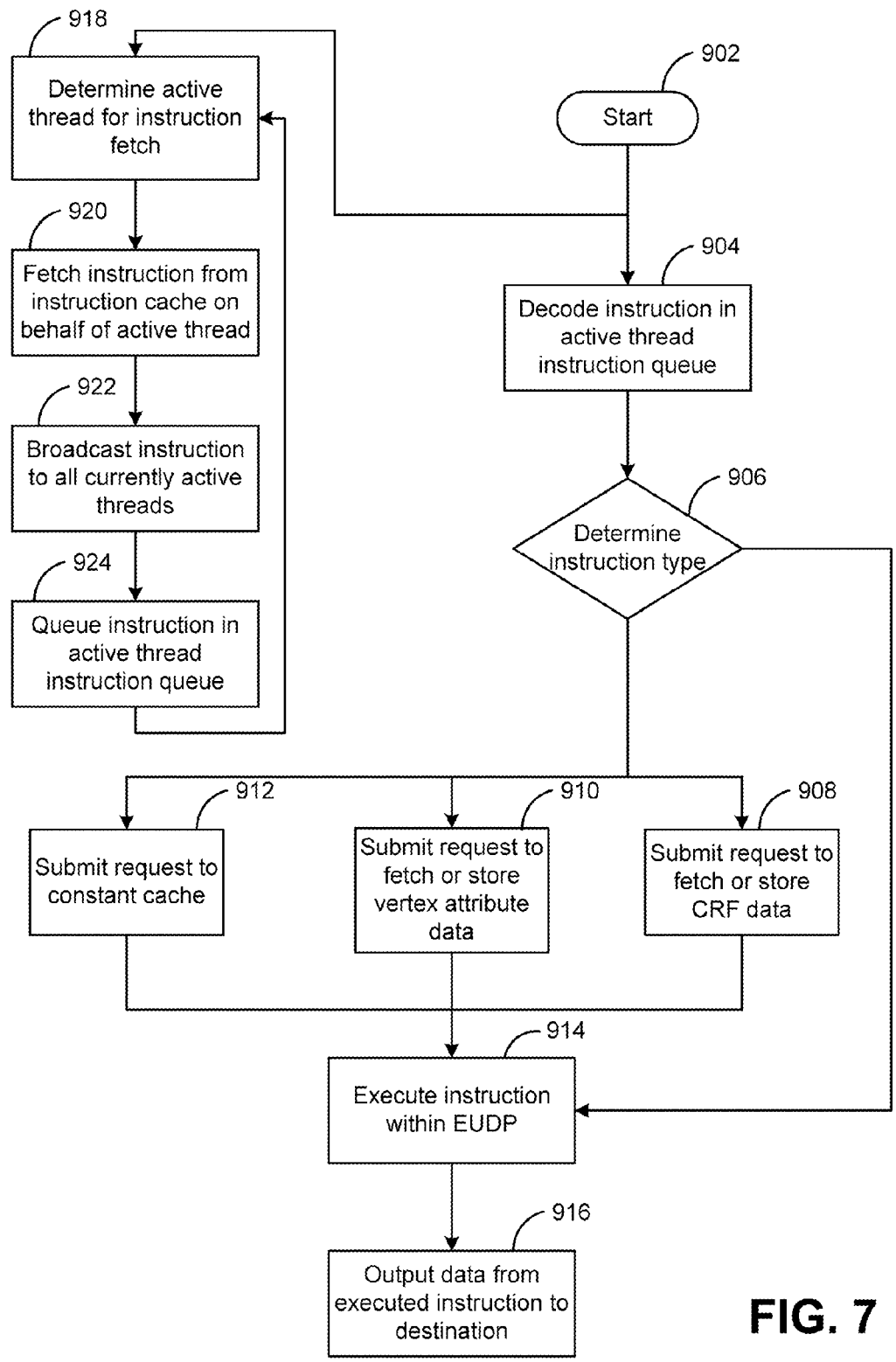
FIG. 7 depicts a flow diagram of a method in accordance with an embodiment of the disclosure.

Reference is now made to FIG. 7, which depicts a flowchart of a method in accordance with the disclosure. FIG. 7 depicts steps undertaken by an execution unit and components within the execution unit to execute instructions making up tasks assigned to the execution unit and embodied in threads corresponding to programmable shaders. The method begins at step 902, where it branches to two parallel collections of method steps. The first collection, beginning at step 918, describes thread level arbitration for instruction fetch and queue. The second collection, beginning at step 904, describes instruction level execution arbitration and scheduling. The first parallel branch begins at step 918, where it is determined on behalf of which active thread to prefetch an instruction. This determination can be made by analyzing the age of each active thread where an instruction is fetched on behalf of the oldest of the active threads in an execution unit. Alternatively, an instruction can be fetched on behalf of an active thread that has waited the longest amount of time since an instruction was last fetched on its behalf. Other schemes which could be used to determine which active thread to fetch an instruction on behalf of will be appreciated by those skilled in the art.

In step 920, an instruction is fetched from an instruction cache on behalf of an active thread. If the instruction is not located within the instruction cache, then it may be necessary to retrieve the instruction from a level 2 cache or other memory system. The fetched instruction is delivered to an active thread by broadcasting it on a broadcast bus that all currently active threads can access in step 922. Accordingly, if more than one thread is requesting the same instruction from instruction cache, this can reduce latency by eliminating at least one instruction fetch from the instruction cache. In other words, if more than one thread is requesting the same instruction from instruction cache, it is not necessary to individually fetch and deliver the instruction on behalf of each thread because the requested instruction is returned from instruction cache via an instruction broadcast bus, which is available to all even and odd threads executing within the execution unit.

An active thread requiring a fetched instruction will then queue the instruction in its instruction queue in step 924. As noted above, in an execution unit, each active thread can maintain a separate instruction queue that be sized to store an appropriate number of instructions given the latency of an instruction fetch from an instruction cache.

The second instruction level arbitration parallel branch begins at step 904, where the next instruction to be executed in a particular active thread is decoded or "pre-decoded" to determine what type of operations the instruction requires. In step 906, the instruction type is determined. The instruction operand type can include but is not limited to a constant cache access request, a vertex attribute access cache request, and common register file access request, or operations that can be immediately executed by the EUDP. If the instruction requests to fetch or store a constant or otherwise interact with a constant cache, then in step 912 the instruction is submitted to a constant cache. If the instruction requests to fetch or store vertex attribute data or otherwise interact with a vertex attribute cache, then in step 910 the instruction is submitted to a vertex attribute cache. If the instruction requests to interact with either common register file, then the instruction is submitted to the common register file in step 908. If the instruction can be executed by the EUDP without interacting with any of the above, then the instruction can be submitted directly to the EUDP in step 914. In step 916, after execution of the instruction by the EUDP, data is output to its destination, whether it is a component external to an execution unit, such as a texture unit or to other components within the execution unit.

The embodiments of the present invention can be implemented in hardware, software, firmware, or a combination thereof. In some embodiments, the compression of color data is implemented in software or firmware that is stored in a memory and that is executed by a suitable instruction execution system. If implemented in hardware, as in an alternative embodiment, the triangle setup and attribute setup stages can be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. Further, such process descriptions or blocks in flow charts can also represent portions of hardware logic configured to operate in a manner consistent with implementing specific logical functions or steps in the process, and alternate implementations included within the scope of embodiments of the invention.

It should be emphasized that the above-described embodiments of the present invention, particularly, any "preferred" embodiments, are merely possible examples of implementations, set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Having thus described the invention, at least the following is claimed:

1. A graphics processing unit, comprising:
   an execution unit configured to execute programmable shader operations, wherein the execution unit is further configured to simultaneously process operations for a plurality of threads;
   a first memory forming a register file configured to accomodate register operations for all threads executed by the execution unit, the first memory being organized in a plurality of banks, with a first plurality of banks being allocated to a first plurality of the threads and a second plurality of banks being allocated to the remaining threads;
   a second memory forming a constant cache configured to accomodate the fetching of constants for a plurality of shader operations executed within the execution unit, the constant cache configured to store a plurality of contexts of values for each of a plurality of types of shaders, the constant cache further configured to store a plurality of constant values and a plurality of versions of constant values in each context stored within the constant cache; and
   a third memory forming a vertex attribute cache configured to accommodate the storing of vertex attributes processed by programmable shader operations executed by the execution unit.

2. The graphics processing unit of claim 1, further comprising:
   a register arbiter configured to arbitrate requests to access the register file from instructions executed within the execution unit.

3. The graphics processing unit of claim 1, further comprising:
   a constant cache arbiter configured to arbitrate requests to access the constant cache from instructions executed within the execution unit.

4. The graphics processing unit of claim 1, further comprising:
   a vertex attribute cache arbiter configured to arbitrate requests to access the vertex attribute cache from instructions executed within the execution unit.

5. The graphics processing unit of claim 1, wherein:
   the constant cache is configured to maintain two or more contexts of constants for each of geometry shader, vertex shader, and pixel shader corresponding to a header table.

6. The graphics processing unit of claim 5, wherein:
the constant cache is configured to maintain two or more versions of constants for each context corresponding to a mapping table.

7. The graphics processing unit of claim 3, further comprising:
a constant cache FIFO configured to store requested constants retrieved from the constant cache and make the requested constants available for execution of operations by the plurality of threads executing in the execution unit.

8. The graphics processing unit of claim 4, further comprising:
a vertex attribute cache FIFO configured to store requested vertex attributes retrieved from the vertex attribute cache and make the requested vertex attributes available for execution of operations by the plurality of threads executing in the execution unit.

9. A graphics processing unit comprising:
an execution unit capable of multi-threaded operation, the execution unit having a thread controller, the thread controller including a first instruction fetch arbiter and a second instruction fetch arbiter; and
a constant cache configured to accommodate the fetching of constants for a plurality of shader operations executed within the execution unit, the constant cache configured to store a plurality of contexts of values for each or a plurality of types of shaders, the constant cache further configured to store a plurality of constant values and a plurality of versions of constant values in each context stored within the constant cache:
wherein the first instruction fetch arbiter is configured to fetch instructions on behalf of at least half of a plurality of threads within the execution unit; and
wherein the second instruction fetch arbiter is configured to fetch instructions on behalf of the remainder of the plurality of threads.

10. The graphics processing unit of claim 9, wherein:
the execution unit is capable of processing at least eight active threads, wherein at least four of the at least eight active threads assigned to the first instruction fetch arbiter and the remainder of the at least eight active threads assigned to the second instruction fetch arbiter.

11. The graphics processing unit of claim 10, further comprising:
an instruction cache configured to deliver instructions to the at least eight active threads; wherein
the first instruction fetch arbiter is configured to fetch instructions from the instruction cache system on behalf of at least half of the at least eight active threads, and the second instruction fetch arbiter is configured to fetch instructions from the instruction cache system on behalf of the remainder of the at least eight threads; and
the first instruction fetch arbiter and the second instruction fetch arbiter are configured to broadcast fetched instructions to the at least eight threads.

12. The graphics processing unit of claim 11, wherein each of the at least eight active threads further comprises:
an instruction queue configured to queue a first instruction delivered from the instruction cache, and
an instruction pre-decoder configured to determine a type of data request for a second instruction in the instruction queue.

13. The graphics processing unit of claim 12, wherein the type of data request of the second instruction is at least one chosen from: a request to a constant cache, a request to a vertex attribute cache, a request to a common register file, and a request to the direct execution in data path unit.

14. The graphics processing unit of claim 12, wherein the instruction pre-decoder is further configured to submit the second instruction requests to at least one of: a constant cache arbiter, a vertex attribute cache arbiter, a common register file arbiter and an execution unit data path.

15. The graphics processing unit of claim 12, wherein the execution unit is configured to fetch the first instruction and determine a type of the second instruction data requests in the instruction queue substantially simultaneously.

16. The graphics processing unit of claim 12, wherein the thread controller is configured to issue a third instruction to the execution unit data path.

17. A method of processing instructions in a graphics processing unit, comprising the steps of:
fetching a first instruction in an execution unit from an instruction cache on behalf of one of a plurality of active threads,
broadcasting the first instruction to the plurality of active threads,
queueing the first instruction in an instruction queue corresponding to at least one of the plurality of active threads,
decoding a second instruction in the instruction queue of at least one of the plurality of active threads,
submitting the second instruction as a data request to each of a constant cache, a vertex attribute cache, a first common register file, a second common register file, and an execution unit data path.

18. The method of claim 17, wherein:
the steps of fetching the first instruction and submitting the second instruction occur substantially simultaneously.

19. The method of claim 17, further comprising the step of:
submitting a request to the constant cache, wherein the constant cache maintains a header table containing a physical base address of at least one set of constants according to a shader type and context and wherein the constant cache is configured to maintain at least two contexts of constants corresponding to vertex shader, pixel shader and geometry shader.

20. The method of claim 19, wherein the constant cache further maintains a mapping table containing constants in the constant cache that have been modified and the address in the constant cache of a modified constant value.

21. The method of claim 17, wherein the constant cache, vertex attribute cache, first common register file, second common register file and execution unit data path are configured to process instructions substantially simultaneously.

22. The method of claim 17, further comprising the steps of:
issuing the second instruction to the execution unit data path when data required for execution of the instruction has been retrieved; and
outputting data from the execution unit data path via an output buffer.

* * * * *